(12) United States Patent
Meynard et al.

(10) Patent No.: US 7,847,535 B2
(45) Date of Patent: Dec. 7, 2010

(54) METHOD AND DEVICE FOR SUPPLY TO A MAGNETIC COUPLER

(75) Inventors: Thierry Antoine Meynard, Beauzelle (FR); Francois Forest, St. Clement de Riviere (FR); Frederic Richardeau, Flourens (FR); Eric Laboure, Cachan (FR)

(73) Assignees: Centre National de la Recherche Scientifique (C.N.R.S.), Paris (FR); Institut National Polytechnique de Toulouse, Toulouse (FR); Universite Montpellier II, Montpellier (FR)

( * ) Notice: Subject to any disclaimer, the term of this patent is extended or adjusted under 35 U.S.C. 154(b) by 293 days.

(21) Appl. No.: 11/994,855

(22) PCT Filed: Jul. 4, 2006

(86) PCT No.: PCT/FR2006/001579
§ 371 (c)(1),
(2), (4) Date: May 14, 2008

(87) PCT Pub. No.: WO2007/006902
PCT Pub. Date: Jan. 18, 2007

(65) Prior Publication Data
US 2008/0218150 A1 Sep. 11, 2008

(30) Foreign Application Priority Data
Jul. 5, 2005 (FR) .................................. 05 07136

(51) Int. Cl.
*H01F 30/12* (2006.01)
*H02M 7/00* (2006.01)
(52) U.S. Cl. ......................................... 323/361; 363/65
(58) Field of Classification Search .................. 363/65, 363/69–71, 67; 323/361; 307/54, 58, 61, 307/63, 82, 83
See application file for complete search history.

(56) References Cited

U.S. PATENT DOCUMENTS

| 4,931,919 | A  | * | 6/1990  | Nguyen et al. ................ 363/37 |
| 5,337,227 | A  |   | 8/1994  | Stacey et al. |
| 5,703,767 | A  |   | 12/1997 | Stacey et al. |
| 6,650,557 | B2 | * | 11/2003 | Ferens et al. ................ 363/126 |
| 7,026,727 | B2 | * | 4/2006  | Readio et al. ................. 307/83 |

OTHER PUBLICATIONS

Park et al., "Modeling and Analysis of Multi-Interphase Transformers for Connecting Power Converters in Parallel", Power Electronics Specialists Conference, 1997, pp. 1164-1170, XP010241695.

* cited by examiner

*Primary Examiner*—Matthew V Nguyen
(74) *Attorney, Agent, or Firm*—Young & Thompson (57) ABSTRACT

The invention relates to a method for supply to a magnetic coupler comprising several pairs of windings, each pair being formed from a first and a second adjacent paired winding, magnetically coupled to each other by means of a core of magnetic material. The method further consists of supplying the first winding of each pair with a supply voltage or current out of phase by an angle a with relation to the supply voltage or current for the second winding of the same pair. The absolute value of the angle a is greater than or equal to 4p/N for at least one pair of windings.

17 Claims, 6 Drawing Sheets

METHOD AND DEVICE FOR SUPPLY TO A MAGNETIC COUPLER

FIELD OF THE INVENTION

The present invention relates to a method and a device for supplying a magnetic coupler.

BACKGROUND OF THE INVENTION

Magnetic couplers (multi-interphase transformers) are used for example to connect a load to a polyphase supply source.

It is known to use polyphase supply sources which can generate N periodic supply currents or voltages which are offset angularly relative to one another, N being an integer which is greater than or equal to 4. The angular offsets between the supply currents or voltage used are uniformly distributed between 0 and $2\pi$ rad. Angular offset of $2\pi$ rad corresponds to a period of the current or voltage.

Known magnetic couplers comprise several pairs of windings, each pair being formed by a first and a second adjacent winding which are connected to one another magnetically by means of a core made of magnetic material, or a magnetic core. Different structures of known magnetic couplers are described in the following article:

"Modeling and Analysis of Multi-Interphase Transformers for Connecting Power Converters in Parallel", IN GYU PARK and SEON IK KIM, Dept. of Control and Instrumentation Eng., Wonkwang University, Iksan, Chonbuk, 570-749 Korea, IEEE 1997.

The known methods for supplying these couplers consist in supplying the first winding of each pair with a supply current or voltage which is offset angularly by an angle $\alpha$ relative to the supply current or voltage of the second winding of the same pair.

In the known methods, the angle $\alpha$ is equal to $2\pi/N$ for each pair of windings.

The magnetic couplers thus supplied function correctly but are cumbersome. It is now desirable to reduce the size of these magnetic couplers.

OBJECT OF THE INVENTION

The object of the invention is thus to propose a method for supplying a magnetic coupler which, for the same performance level, makes it possible to reduce the size of the magnetic coupler. The object of the invention is thus a method for supplying a magnetic coupler in which the absolute value of the angle $\alpha$ is greater than or equal to $$\frac{4\pi}{N}$$

for at least one pair of windings.

SUMMARY OF THE INVENTION

It has been observed that, for the same performance level, selecting the absolute value of the angle $\alpha$ as being greater than or equal to $$\frac{4\pi}{N}$$

for at least one pair of windings reduces the maximum magnetic flux which passes through the magnetic core which connects the windings of this pair. In fact, by imposing a value of this type for the absolute value of the angle $\alpha$ for at least one of the pairs of windings, the situation is approached in which the angular offset of the supply currents or voltages of this pair of windings is equal to $\pi$ rad, which corresponds to an optimal reduction of the maximum magnetic flux which can be observed in the magnetic core which connects these two windings.

Since the maximum magnetic flux which passes through the cross-section of a magnetic core is reduced, it is possible to reduce the dimensions of this magnetic core, in such a way that the size of the coupler is also reduced.

In addition, because of the regular distribution of the angular offsets of the N supply currents or voltages, the current or voltage harmonics in the load supplied by means of this coupler are reduced.

The embodiments of this supply method can comprise one or more of the following characteristics:

the absolute value of the angle $\alpha$ is greater than or equal to $$\frac{4\pi}{N}$$

for each pair of windings;

the absolute value of the angle $\alpha$ is between $$\pi - \frac{2\pi}{N} \text{rad and } \pi + \frac{2\pi}{N} \text{rad}$$

for each pair of windings;

when N is odd, the absolute value of the angle $\alpha$ is equal to $[(N-1)/2]\cdot(2\pi/N)$;

when N is a multiple of 4, the absolute value of the angle $\alpha$ is equal to $[(N/2)-1]\cdot(2\pi/N)$; and when N is even, the angle $\alpha$ is equal to $[(N/2)-1]\cdot(2\pi/N)$ for $$\frac{N}{2} - 1$$

pairs of windings, to $\pi$ for two pairs of windings, and to $-[(N/2)-1]\cdot(2\pi/N)$ for the other pairs of windings.

These embodiments of the supply method also have the following advantages:

selecting an angle $\alpha$, the absolute value of which is greater than or equal to $$\frac{4\pi}{N}$$

for, each pair of windings, makes it possible to reduce the size of the magnetic coupler;

the selection of an angle $\alpha$, the absolute value of which is between $$\pi - \frac{2\pi}{N} \text{rad and } \pi + \frac{2\pi}{N} \text{rad}$$

for each pair of windings makes it possible to obtain optimal reduction of the size of the magnetic coupler; and use of the formulae previously provided in order to calculate the angle α according to the value of N makes it possible to obtain an angular offset close to π for each pair of windings, and therefore optimal reduction of the size of the magnetic coupler.

The object of the invention is also a device for supplying an electric dipole, this device comprising:

an N-phase supply source, the angular offsets between phases being regularly distributed between 0 and 2π rad, N being greater than or equal to four;

a magnetic coupler to connect each of the phases of the supply source simultaneously to the electric dipole, the magnetic coupler comprising a plurality of pairs of windings, each pair of windings being formed by a first and a second adjacent winding which are connected magnetically to one another by means of a core made of magnetic material, the first winding of each pair being supplied by a phase of the supply source which is offset angularly by an angle α relative to the phase of the supply source which supplies the second winding of the same pair; and the absolute value of the angle α is greater than or equal to 4π/N for at least one pair of windings.

The embodiments of this device can comprise one or more of the following characteristics:

for each first pair of windings, the magnetic coupler comprises a second pair of windings which are associated with this first pair of windings, each second pair of windings being formed by a third and a fourth adjacent winding which are connected magnetically to one another and to the first and second windings of the first pair associated by means of the same core made of magnetic material, the second pair being isolated electrically from the first associated pair of windings, only the first and second windings being connected to the phases of the supply source, and only the third and fourth windings being connected to the electric dipole;

the first winding of each pair is connected directly to one of the phases of the supply source, whereas the second winding of the same pair is connected to a different phase of the supply source by means of the first winding of another pair of windings;

the first and second windings of each pair of windings are connected directly to respective phases of the supply source;

each pair of windings is magnetically independent from the other pairs of windings;

each first or second winding of the magnetic pair belongs both to a first and a second pair of windings;

each winding is wound around a branch made of magnetic material which has a first and a second end, the first ends of each branch being connected magnetically by means of a first leg made of magnetic material, the second ends of each branch being connected magnetically by means of a second leg made of magnetic material, the first and second legs each describing a loop which connects all the branches;

each phase of the supply source imposes a supply current or voltage, the wave forms of these supply current or voltages all being identical, but for an angular offset which is approximately a multiple of 2π/N.

These embodiments of the supply device also have the following advantages:

the use of a second pair of windings associated with each first pair of windings makes it possible to obtain galvanic isolation of the load relative to the supply source;

the fact that each pair of windings is isolated mechanically from the other pairs of windings makes it possible to use transformers with two windings in order to provide a magnetic coupler, which facilitates production of said magnetic coupler from standard magnetic cores;

the fact that each winding belongs both to a first and a second pair of magnetic windings balances the currents or voltages in the magnetic coupler, which makes it possible to obtain a reduction of the size of the latter.

BRIEF DESCRIPTION OF THE DRAWINGS

The invention will be better understood by reading the following description, provided solely by way of example and with reference to the drawings, in which.

DETAILED DESCRIPTION OF THE INVENTION

Figure 1:
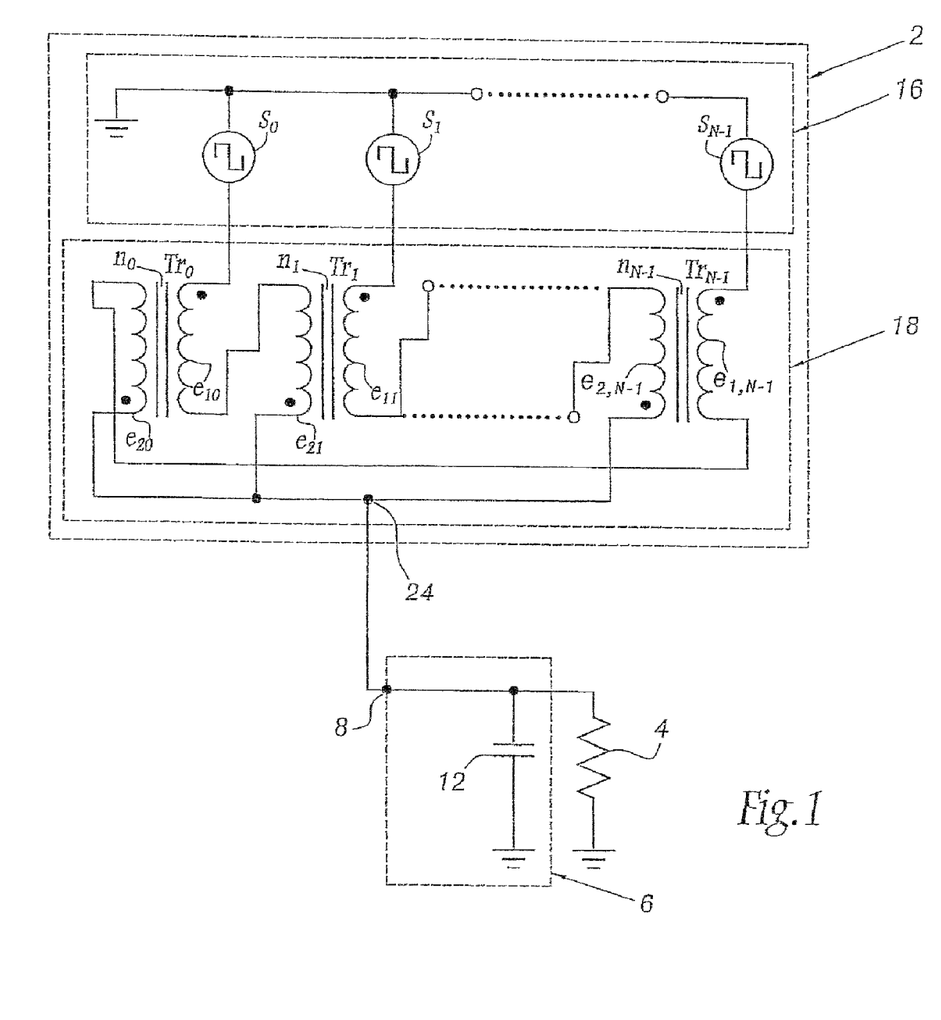
FIG. 1 is a circuit diagram of a first device for supplying a load by means of a magnetic coupler.

FIG. 1 represents a device 2 for supplying an electric dipole 4. In this case, the dipole 4 is connected to the device 2 by means of a filter 6 which is equipped with an input 8.

The dipole 4 is a resistor, for example.

The filter 6, is for example, a filter comprising only a filtering capacitor 12 which is connected parallel to the terminals of the dipole 4. In this case, the device 2 makes it possible to avoid the use of a filtering inductor.

The device 2 comprises a polyphase voltage source 16 and a magnetic coupler 18 in order to connect the source 16 to the dipole 4.

The source 16 is an N-phase source with N being an integer greater than or equal to 4. The source 16 thus supplies N voltages $V_i$, in which the value i is the number of the phase contained between 0 and N−1. By convention, the angular offset between the voltages $V_0$ and $V_i$ is equal to $$\frac{2\pi i}{N}.$$

Figure 2:
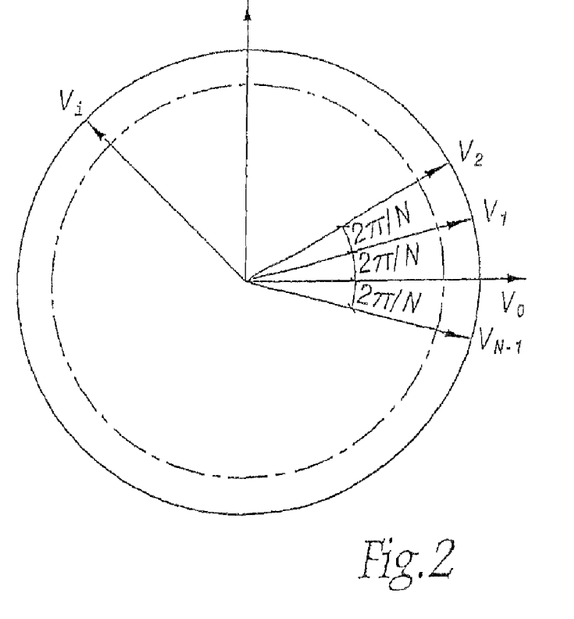
FIG. 2 is a graph illustrating the distribution of the phases of a supply source of the device in FIG. 1.

The angular offsets between the voltages $V_0$ to $V_{N-1}$ are thus regularly distributed between 0 and 2π rad, as illustrated in FIG. 2.

In FIG. 2, each vector corresponds to a voltage $V_i$, the modulus of this vector corresponding to the modulus of the fundamental component of voltage, and the angle of this vector relative to the X-axis corresponding to its phase displacement relative to the fundamental component of the voltage $V_0$. As illustrated, when the phase displacement of the fundamental components of the voltages $V_0$ to $V_{N-1}$ is regularly distributed, the angle of phase displacement between two successive voltage vectors on the graph in FIG. 2 is equal to $2\pi/N$.

In this case, the amplitudes of the voltages $V_0$ to $V_{N-1}$ are all identical, since all the voltages $V_0$ to $V_{N-1}$ have the same periodic wave forms which are offset relative to one another by angular offset equal to $$\frac{2\pi}{N} \text{rad.}$$

In FIG. 1, the source 16 has been represented in the form of N monophase voltage sources $S_0$ to $S_{N-1}$ which supply the voltages $V_0$ to $V_{N-1}$. By way of illustration, the angular offset of the voltage which is generated by each source $S_i$ can be regulated in order to correspond to any of the voltages $V_0$ to $V_{N-1}$. The voltages $V_0$ to $V_{N-1}$ are not generated in order by the sources $S_0$ to $S_{N-1}$, as will be seen hereinafter.

In order to simplify FIG. 1, only three voltage sources $S_0$, $S_1$ and $S_{N-1}$ have been represented.

The source 16 is, for example, a polyphase supply network, a polyphase voltage inverter or chopper, a controllable voltage rectifier formed by diodes and thyristors, or a primary stage of a "flyback" supply. These periodic voltages $V_i$ are not necessarily sinusoidal, but are, for example, rectangular or triangular, and can comprise a continuous component.

In this embodiment, the coupler 18 comprises N monophase transformers $Tr_0$ to $Tr_{N-1}$. Each transformer is formed by a primary winding $e_{1i}$ and an adjacent secondary winding $e_{2i}$ which are coupled magnetically to one another by means of a magnetic core $n_i$, in which i is the same value as that previously used.

Each transformer forms a pair of windings which are connected to one another magnetically by means of the magnetic core.

In this case, the N transformers $Tr_i$ are magnetically independent from one another.

In order to simplify the Fig., only three transformers $Tr_0$, $Tr_1$ and $Tr_{N-1}$ have been represented in FIG. 1.

Each primary winding $e_{1i}$ is directly connected by one end to the source $S_i$.

The secondary winding $e_{2i}$ of each transformer $Tr_i$ is connected to the source $S_{i-1}$ by means of the primary winding $e_{1, i-1}$ of the transformer $Tr_{i-1}$. If the value i is equal to 0, the secondary winding $e_{20}$ is connected to the source $S_{N-1}$ by means of the winding $e_{1,N-1}$ of the transformer $Tr_{N-1}$.

The end of each secondary winding which is not connected to one of the sources $S_i$ is directly connected to a mid-point 24, which itself is directly connected to the input 8 of the filter 6.

Figure 3:
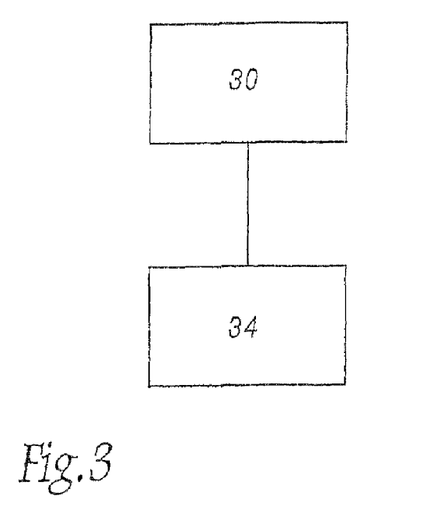
FIG. 3 is a flow chart of a method for supplying the magnetic coupler in the device in FIG. 1.

The mode of operation of the device 2 will now be described in relation to the method in FIG. 3.

Initially, during a step 30, the angular offset of each source $S_0$ to $S_{N-1}$ is regulated in such a way that the supply voltage of the primary winding $e_{1i}$ of each transformer is offset by an angle $\alpha$, the absolute value of which is greater than $$\frac{4\pi}{N},$$

relative to the supply voltage of the secondary winding $e_{2i}$ of the same transformer. In this case, the angular offset of the sources $S_0$ to $S_{N-1}$ is regulated in such a way that the absolute value of the angle $\alpha$ is contained between $$\pi - \frac{2\pi}{N} \text{rad and } \pi + \frac{2\pi}{N} \text{rad}$$

for the windings of each transformer.

More specifically, the angular offset of the sources $S_i$ is regulated in such a way that the absolute value of the angular offset $\alpha$ between the supply voltages of the windings $e_{1i}$ and $e_{2i}$ is equal to:

[(N−1)/2]·(2π/N) if N is an odd number; and
[(N/2)−1]·(2π/N) if N is a multiple of 4.

When N is even, the angle $\alpha$ is equal to [(N/2)−1]·(2π/N) for the $$\frac{N}{2} - 1$$

first transformers, π for the $$\frac{N^{th}}{2}$$

and the $N^{th}$ transformer, and −[(N/2)−1]·(2π/N) for the other transformers.

When N is a multiple of 4, two formulae for calculating the angle $\alpha$ are thus applicable, since N is then also even.

Subsequently, during a step 34, the windings of each transformer are supplied by means of supply voltages which have an angular offset relative to one another by an angle $\alpha$, as determined during the step 30.

Selection of this type of the angle $\alpha$ reduces as far as possible the maximum magnetic flux which passes through the cross-section of the magnetic cores $n_0$ to $n_{N-1}$, in such a way that this cross-section can be reduced, which reduces the global size of the coupler 18. The maximum magnetic flux through the cross-section of the magnetic core is reduced, since increasing the phase displacement between the primary and secondary windings signifies a move away from the situation in which, at a given moment, the maximum magnetic fields created by these two windings are combined inside the magnetic core.

Figure 4:
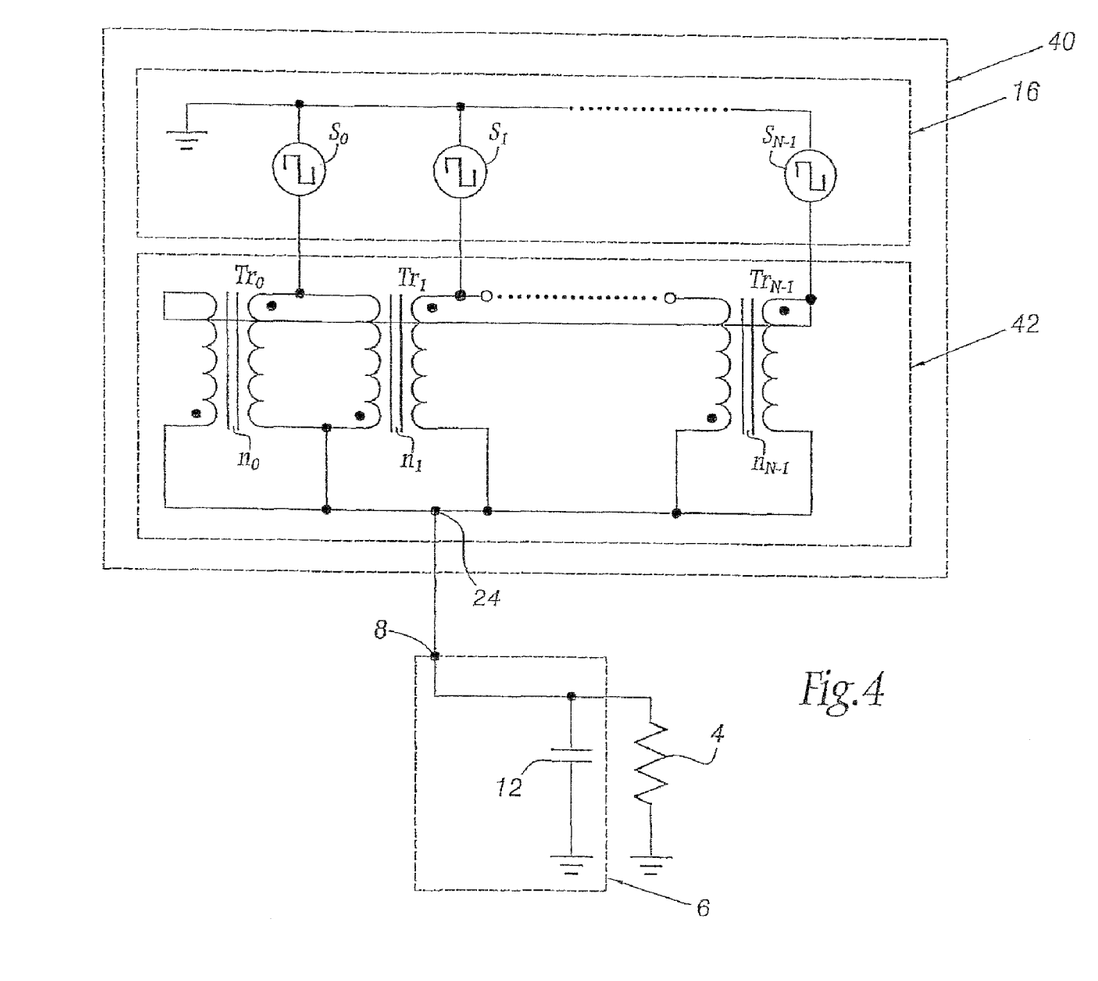
FIGS. 4 and 5 are circuit diagrams of a second and a third embodiment respectively of a device for supplying a load by means of a magnetic coupler.

FIG. 4 represents a second embodiment of a device 40 for supplying the dipole 4. In FIG. 4 the elements which have already been described in relation to FIG. 1 bear the same reference numerals.

The device 40 comprises the supply source 16 and a magnetic coupler 42. The coupler 42 differs from the coupler 18 only in the fact that the primary and secondary windings of each transformer are connected directly to respective voltage sources $S_i$. The supply method is identical to that described in relation to FIG. 3. This supply method also makes it possible to reduce the maximum magnetic flux which passes through the cross-section of each magnetic core $n_0$ to $n_{N-1}$.

Figure 5:
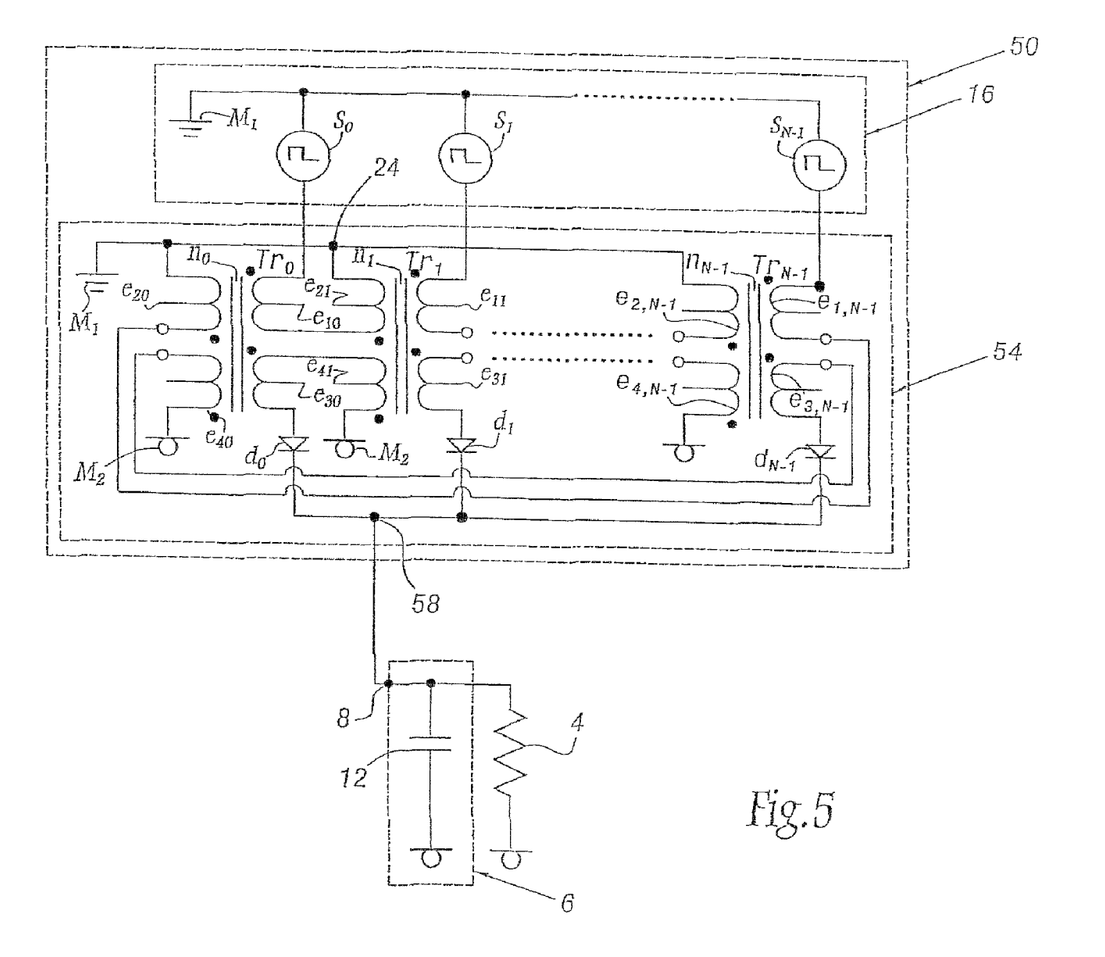

FIG. 5 represents a third embodiment of a device 50 for supplying the dipole 4. In this Fig., the elements which have already been described in relation to FIG. 1 bear the same numerical references, and only the differences in comparison with the device 2 are described here.

In FIG. 5, the filter 6 does not have to comprise an induction coil.

The device 50 comprises the supply source 16 connected to the dipole 4 by means of a magnetic coupler 54.

In the coupler 54, the mid-point 24 is connected to a reference potential $M_1$, and no longer to the input 8 of the filter 6.

In this embodiment, each transformer $Tr_i$ comprises in addition to the pair of windings $e_{1i}$ and $e_{2i}$, a pair of windings $e_{3i}$ and $e_{4i}$. The windings $e_{3i}$ and $e_{4i}$ are coupled magnetically to the windings $e_{1i}$ and $e_{2i}$ by means of the magnetic core $n_i$. The pair of windings $e_{3i}$ and $e_{4i}$ is electrically isolated from the windings $e_{1i}$ and $e_{2i}$.

One end of the winding $e_{3i}$ is connected by means of a diode $d_i$ to a common point 58. The cathode of the diode $d_i$ faces the common point 58.

The common point 58 is directly connected to the input 8 of the filter 6.

The other end of the winding $e_{3i}$ is directly connected to an end of the winding $e_{4,i+1}$ of the following transformer $Tr_{i+1}$. The end which is not connected to the winding $e_{3i}$ of the winding $e_{4,i+1}$ is connected to a reference potential $M_2$ which is isolated electrically from the potential $M_1$.

The end which is not connected to the common point 58 of the winding $e_{3,N-1}$ is directly connected to an end of the winding $e_{40}$.

The method for supplying the coupler 54 is the same as that described with reference to FIG. 3, so as to reduce the size of this coupler.

Figure 6:
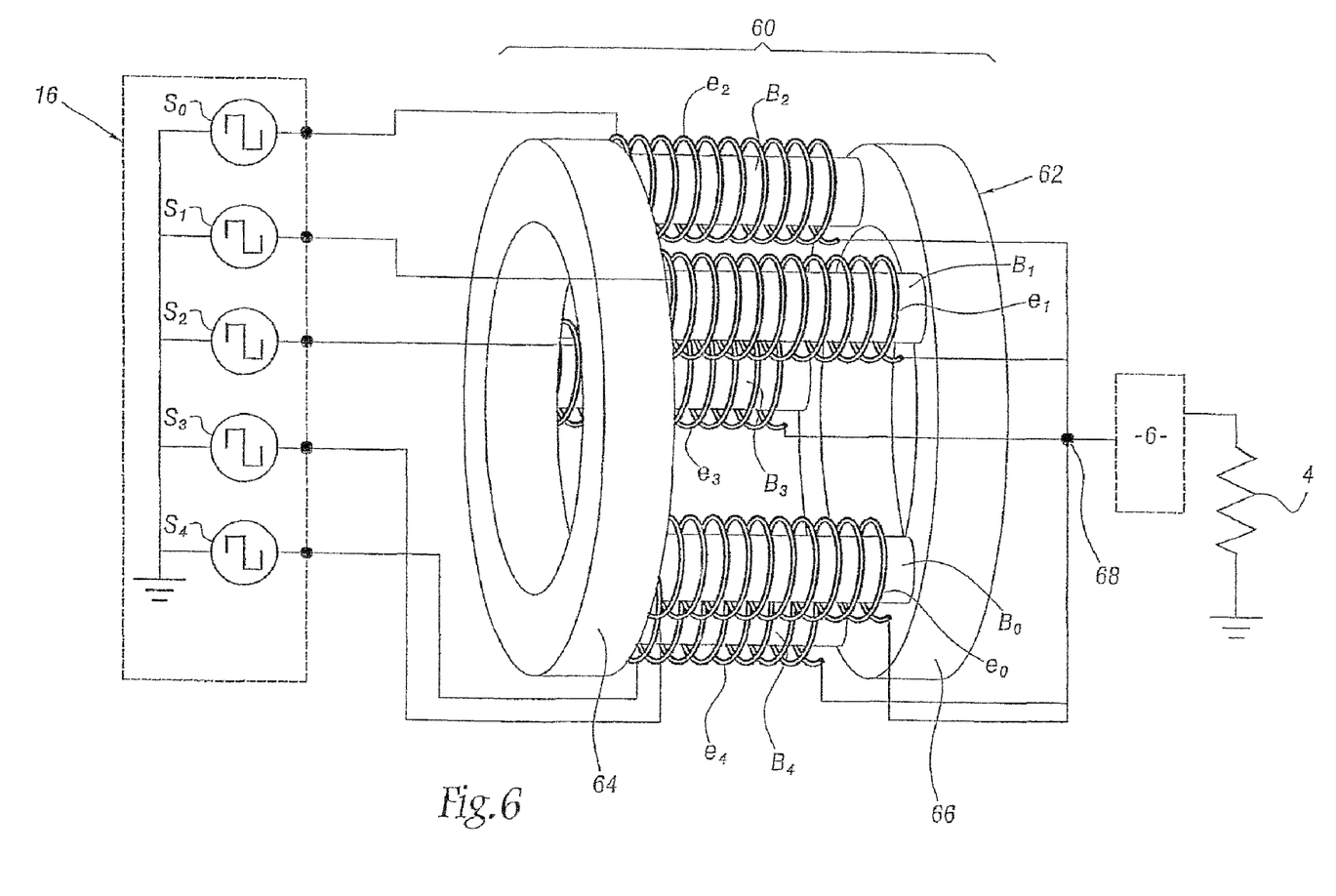
FIG. 6 is a schematic perspective illustration of the structure of a monolithic magnetic coupler which can be used in the devices in FIGS. 1, 4 and 5.

FIG. 6 represents a monolithic magnetic coupler 60 which can be used instead of, and in the place of, the magnetic couplers 18, 42 and 54. Unlike the couplers 18, 42 and 54, this coupler 60 is not made from a plurality of monophase transformers each comprising a magnetic core which is magnetically independent from the other magnetic cores $n_i$.

In this case, the coupler 60 comprises a monolithic magnetic core 62 with a plurality of horizontal branches $B_0$ to $B_{N-1}$. In FIG. 6, N is equal to 5. The left-hand ends of the branches $B_0$ to $B_{N-1}$ are magnetically connected to one another by a vertical circular leg 64. The right-hand ends of the branches $B_0$ to $B_{N-1}$ are magnetically connected to one another by means of another, straight vertical circular leg 66 on the right.

In this case, each of the legs 64 and 66 forms a loop or a circuit which is closed on itself, and connects all the branches $B_i$.

A conductor forms a winding $e_i$ around each horizontal branch $B_i$. An end of each winding $e_i$ is connected directly to a common point 68, and the common point 68 is connected, for example by means of the filter 6, to the dipole 4.

The other end of each winding $e_i$ is connected to a respective source $S_i$ of the supply source 16.

In this case, the adjacent windings $e_i$, $e_{i+1}$ which are supported by two successive horizontal branches $B_i$, $B_{i+1}$ form a pair of windings which are connected to one another magnetically by means of the core 62. However, unlike the preceding embodiment, in this case a single winding can belong to two different pairs of adjacent windings. This situation is illustrated in FIG. 6 by means of the winding $e_2$, which forms a first pair of windings with the winding $e_1$, and a second pair of windings with the winding $e_3$.

The method for supplying the coupler 60 is identical to that described with reference to FIG. 3. The use of the supply method in FIG. 3 makes it possible to reduce the maximum magnetic flux which passes through the cross-section of the legs 64 and 66, in such a way that the size of this coupler 60 can be reduced.

Figure 7:
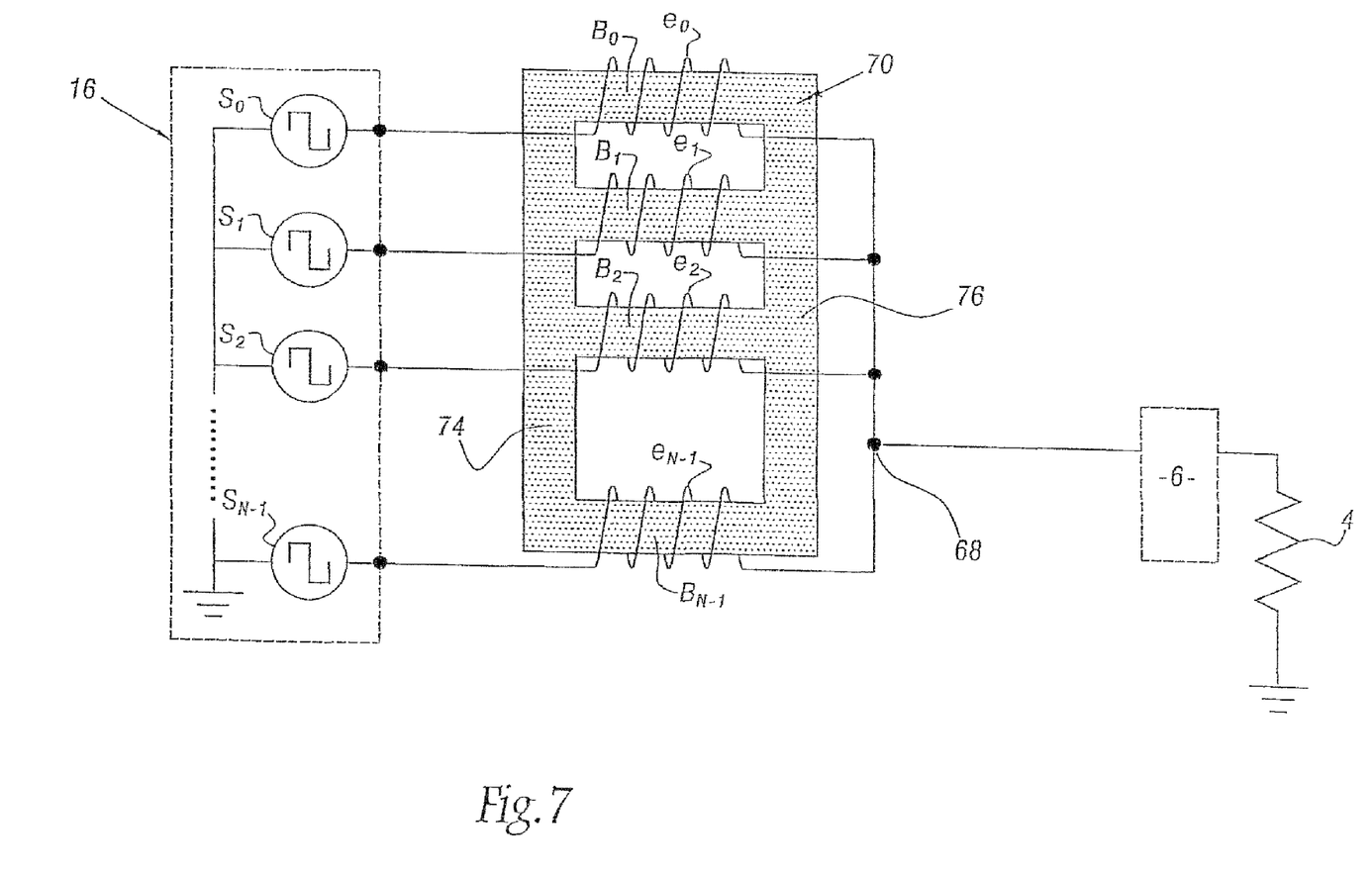
FIG. 7 is a schematic illustration of the structure of another monolithic magnetic coupler which can be used in the devices in FIGS. 1, 4 and 5.

FIG. 7 represents another embodiment of a rack-like monolithic magnetic coupler 70 which can be used instead of, and in place of; the magnetic couplers 18, 42 and 54.

In FIG. 7, the elements which have already been described in relation to FIG. 6 bear the same reference numerals.

The coupler 70 differs from the coupler 60 substantially in that the vertical legs 64 and 66 are replaced by vertical uprights 74 and 76 respectively. Thus, the uprights 74 and 76 connect the ends of the branches $B_0$ to $B_{N-1}$ magnetically. However, in this embodiment, the uprights 74 and 76 do not form a loop or circle which is closed on itself and connects all the branches $B_i$.

The other characteristics represented in FIG. 7 are identical to those represented in FIG. 6, and will not be described again.

The method for supplying the coupler 70 is identical to that described with reference to FIG. 3.

Many other embodiments of the preceding supply devices and of the supply method are possible. For example, the monophase voltage sources of the source 16 can be replaced by monophase current sources which can be regulated. In this case, the supply method is identical to that in FIG. 3, except that the angle α represents angular offset between the supply currents of a pair of windings, and the filter 6 has no induction coil.

In the embodiment in FIG. 5, the windings $e_{1i}$ and $e_{2,i+1}$ can be connected in parallel between the supply source and the first reference potential $M_1$, instead of being connected in series, as described with reference to FIG. 5. Similarly, the windings $e_{3i}$ and $e_{4i+1}$ can also be connected in parallel between the common point 58 and the second reference potential $M_2$, instead of being connected in series.

Preferably, the source 16 is formed by N monophase sources, the angular offset of which is not adjustable. In these conditions, the step 30 of the method in FIG. 3 is implemented by connecting the windings $e_{1i}$ and $e_{2i}$ to the appropriate monophase sources, in order to obtain the angular offset α.

The invention claimed is:

1. Method for supplying a magnetic coupler by using N periodic supply currents or voltages which are offset angularly relative to one another, the angular offsets between the N supply currents or voltages used being regularly distributed between 0 and 2π rad, N being an integer greater than or equal to four, the magnetic coupler comprising a plurality of pairs of windings, each pair being formed by first and second adjacent windings which are connected magnetically to one another by means of a core made of magnetic material, the method additionally consisting of supplying the first winding of each pair with a supply current or voltage which is offset angularly by an angle α relative to the supply current or voltage of the second winding of the same pair, characterised in that the absolute value of the angle α is greater than or equal to $$\frac{4\pi}{N}$$

for at least one pair of windings.

2. Method according to claim 1, characterised in that the absolute value of the angle α is greater than or equal to $$\frac{4\pi}{N}$$

for each pair of windings.

3. Method according to claim 2, characterised in that the absolute value of the angle α is between $$\pi - \frac{2\pi}{N} \text{ rad and } \pi + \frac{2\pi}{N} \text{ rad}$$

for each pair of windings.

4. Method according to claim 3, characterised in that:
when N is odd, the absolute value of the angle α is equal to $[(N-1)/2]\cdot(2\pi/N)$;
when N is a multiple of 4, the absolute value of the angle α is equal to $[(N/2)-1]\cdot(2\pi/N)$; and
when N is even, the angle α is equal to $[(N/2)-1]\cdot(2\pi/N)$ for $$\frac{N}{2} - 1$$

pairs of windings, to π for two pairs of windings, and to $-[(N/2)-1]\cdot(2\pi/N)$ for the other pairs of windings.

5. Device for supplying an electric dipole, comprising:
a supply source (16) with N phases, the angular offsets between the phases being regularly distributed between 0 and 2π rad, N being equal to four or more;
a magnetic coupler (18; 42; 54; 60) to connect each of the phases of the supply source simultaneously to the electric dipole, the magnetic coupler comprising a plurality of pairs of windings ($e_{1i}$, $e_{2i}$, $e_i$, $e_{i+1}$), each pair of windings being formed by first and second adjacent windings which are connected magnetically to one another by means of a core made of magnetic material, the first winding of each pair being supplied by a phase of the supply source which is offset angularly by an angle α relative to the phase of the supply source which supplies the second winding of the same pair,
characterised in that the absolute value of the angle α is greater than or equal to 4π/N for at least one pair of windings.

6. Device according to claim 5, characterised in that for each first pair of windings, the magnetic coupler (54) comprises a second pair of windings which are associated with this first pair of windings, each second pair of windings being formed by third and fourth adjacent windings ($e_{3i}$, $e_{4i}$) which are connected magnetically to one another and to the first and second windings of the first pair associated by means of the same core made of magnetic material, the second pair being isolated electrically from the first associated pair of windings, only the first and second windings ($e_{1i}$, $e_{2i}$) being connected to the phases of the supply source, and only the third and fourth windings ($e_{3i}$, $e_{4i}$) being connected to the electric dipole.

7. Device according to claim 5, characterised in that the first winding ($e_{1i}$) of each pair is connected directly to one of the phases of the supply source, whereas the second winding of the same pair is connected to a different phase of the supply source by means of the first winding of another pair of windings.

8. Device according to claim 5, characterised in that the first and second windings of each pair of windings are connected directly to respective phases of the supply source.

9. Device according to claim 5, characterised in that each pair of windings is magnetically independent from the other pairs of windings.

10. Device according to claim 5, characterised in that each first or second winding belongs both to a first and a second pair of windings.

11. Device according to claim 10, characterised in that each winding is wound around a branch made of magnetic material which has a first and a second end, the first ends of each branch being connected magnetically by means of a first leg made of magnetic material, the second ends of each branch being connected magnetically by means of a second leg made of magnetic material, the first and second legs each describing a loop which connects all the branches.

12. Device according to claim 5, characterised in that each phase of the supply source imposes a supply current or voltage, the wave forms of these supply current or voltages all being identical, but for an angular offset which is approximately a multiple of 2π/N.

13. Device according to claim 6, characterised in that the first winding ($e_{1i}$) of each pair is connected directly to one of the phases of the supply source, whereas the second winding of the same pair is connected to a different phase of the supply source by means of the first winding of another pair of windings.

14. Device according to claim 6, characterised in that the first and second windings of each pair of windings are connected directly to respective phases of the supply source.

15. Device according to claim 6, characterised in that each pair of windings is magnetically independent from the other pairs of windings.

16. Device according to claim 6, characterised in that each first or second winding belongs both to a first and a second pair of windings.

17. Device according to claim 6, characterised in that each phase of the supply source imposes a supply current or voltage, the wave forms of these supply current or voltages all being identical, but for an angular offset which is approximately a multiple of 2π/N.

* * * * *